Jan. 20, 1925.
H. O. McMILLAN
CLAMP
Filed July 18, 1923
1,523,438
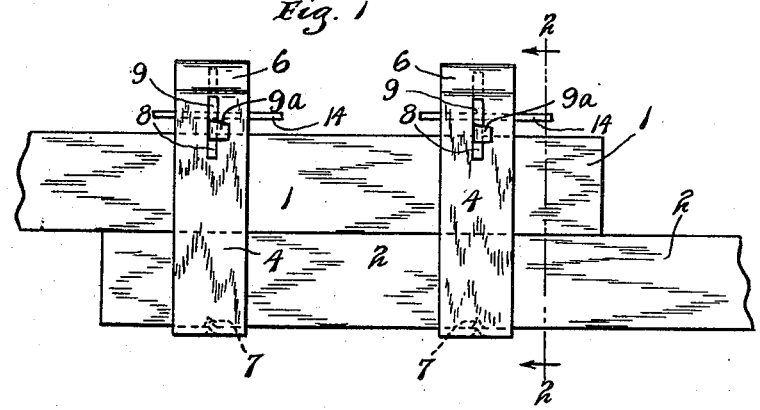
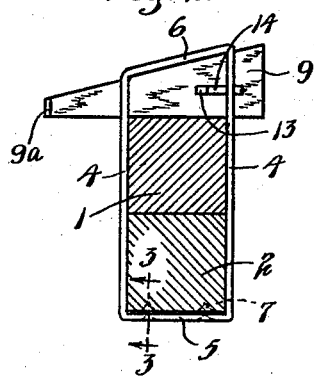
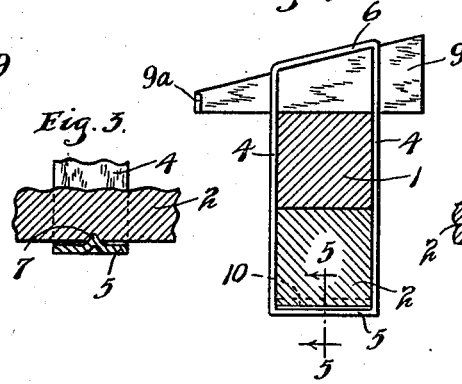
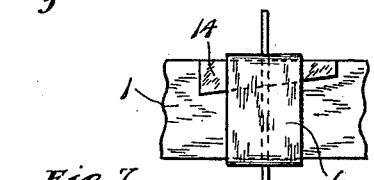
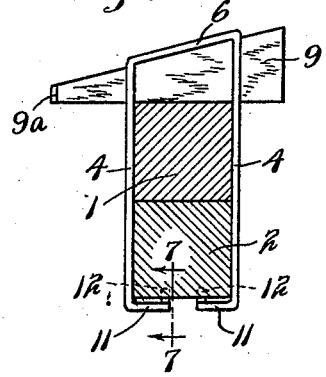
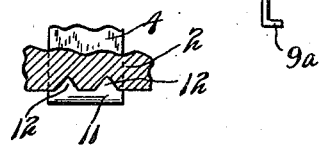
INVENTOR.
HOWARD O. McMILLAN.
BY HIS ATTORNEY.
James F. Williamson Patented Jan. 20, 1925.

1,523,438

UNITED STATES PATENT OFFICE.

HOWARD O. McMILLAN, OF MINNEAPOLIS, MINNESOTA.

CLAMP.

Application filed July 18, 1923. Serial No. 652,380.

*To all whom it may concern:*

Be it known that I, HOWARD O. McMILLAN, a citizen of the United States, residing at Minneapolis, in the county of Hennepin and State of Minnesota, have invented certain new and useful Improvements in Clamps; and I do hereby declare the following to be a full, clear, and exact description of the invention, such as will enable others skilled in the art to which it appertains to make and use the same.

This invention relates to a clamping device for connecting two or more members in rigid relation and while the device is of general application, it is more specifically designed to clamp the longitudinally extending members used in constructing concrete forms for walls, floors, etc., and in scaffolding and other similar structures.

It is an object of this invention to provide an exceedingly simple clamping means which can be easily and quickly placed in operative clamping position which can also be easily and quickly removed.

It is a further object of the invention to provide a clamp formed of comparatively flat strip material bent to form a yoke, one end of which is adapted to contact one of the members clamped and the other end of which carries means for engaging the other member and moving the clamp to clamping position.

It is more specifically an object of the invention to provide such a clamp comprising a yoke of substantially rectangular form having means at one end to engage and clamp one of the members clamped and having aligned narrow slots in its side adjacent its other end through which passes a wedge plate having locking means therein.

These and other objects and advantages of the invention will be fully set forth in the following description made in connection with the accompanying drawings in which like reference characters refer to the same parts throughout the different views and in which, Fig. 1 is a view in side elevation showing a pair of clamps applied to the members clamped;

Fig. 2 is a vertical section taken on the line 2—2 of Fig. 1;

Fig. 3 is a vertical section taken on the line 3—3 of Fig. 2;

Fig. 4 is a vertical section similar to Fig. 2 showing a modified form of the invention;

Fig. 5 is a vertical section taken on line 5—5 of Fig. 4;

Fig. 6 is a view similar to Fig. 2 showing a further modified form of the invention;

Fig. 7 is a vertical section taken on the line 7—7 of Fig. 6; and

Fig. 1$^a$ is a partial plan view of Fig. 1.

Referring to the drawings:—

In Figs. 1, 2, 4 and 6, are shown two longitudinally extending members 1 and 2, which may represent ordinary timbers used in constructing concrete forms, scaffolding, etc., or any other members intended to be clamped together. The main member of the clamp is of yoke form having two parallel sides 4, an end member 5 at right angles to the sides 4, and an end member 6, standing on an incline, in respect to the end 5 and at angles, one acute and the other obtuse, in respect to the parallel sides 4. The said end piece 5 is provided with tongues or brads 7, preferably struck up therefrom, and which are adapted to bite into one of the timbers engaged by the clamp. The parallel sides 4 are each provided, at their upper ends, adjacent to the end members 6, with longitudinally extending slots 8, preferably centrally disposed therein; and which slots 8 are adapted to receive a wedge member 9, for co-operation with the yoke to clamp the timbers 1 and 2 tightly together, when the parts are in working position, as shown in Figs. 1, 2, 4 and 6. This wedge member 9 may be of any suitable form, adapted to be inserted into the slots 8 and removed therefrom, but is preferably provided on the small end with a laterally extending tip 9$^a$, as shown in the drawings, which tip will prevent the accidental displacement of the wedge, when handling the yoke, but which tip is short enough not to interfere with the driving and removal of the wedge to and from working position in the slots 8 in the yoke. The wedge 8 is, of course, made of greater width at its larger end than the length of one or both of the slots 8 in the parallel side members 4, and is of right triangular form, so that the wedge can be driven tightly into position with its straight edge resting on one of the timbers to be clamped together, and its inclined edge co-operating with the under surface of the inclined end 6 of the yoke. While the wedge 9, when driven into place, will be clamped so as to remain in position, a locking device may be provided therefor. To form said locking device, a slot 13 is provided, passing through the wedge 9 and extending longitudinally thereof adjacent one end of the same, so that another right angle wedge 14 may be driven therein, so as to bear flat against the inner side of one side 4 of the yoke and against the end of the slot 13. The wedge 14 clamps or binds in place and prevents endwise movement of the wedge 9, thus firmly locking the same in position. When the clamp is in working position, with the yoke embracing the timbers and the wedge seated in the slots 8, if the wedge then be driven in tightly, the tongues or brads 7 of the end pieces 6 of the yoke will be forced to bite into the timber embraced thereby, and thus prevent any slippage of the yokes on the timbers. When the wedge 9 is tightly in position, the wedge 14 can be driven into place, thus securely locking the wedge 9.

When it is desired to release the timbers and remove the yokes, all that is necessary is to drive out the wedge 14 and drive the wedge 9 backward and tap the inclined ends of the yokes to release the tongues or brads 7 from the adjacent timber, and then slide the yokes lengthwise of the timbers until they come off therefrom.

The foregoing description applies, in all of its details, to the preferred structure shown in Figs. 1, 2 and 3, and in most respects, to the modifications shown in the other views.

In the modification shown in Figs. 4 and 5, the only difference is the presence of two sets of tongues or brads 10 on the end piece 5, instead of a single set, as shown in Figs. 1, 2 and 3.

In the modification shown in Figs. 6 and 7, the parallel side members 4 of the yoke are not joined at the ends thereof opposite the inclined end 6, but have portions 11 bent at right angles thereto and provided with teeth 12 to engage the adjacent timber embraced by the yoke.

The operation may be precisely the same as in the preferred form, but with the yoke constructed as shown in Fig. 6, the same could be spread to permit the yoke to be removed from the timbers, after the wedge was removed, if, for any reason, it should be desirable to leave the timbers permanently in the place where they were clamped at the time the yoke was in working position.

The efficiency and convenience of this clamp has been demonstrated by extensive actual use thereof.

Such a clamp saves a large amount of labor in the erecting of concrete forms, scaffoldings, etc., and the timbers are not damaged or destroyed or weakened, as they are when nailed or bolted into working position.

It will be understood that changes may be made in the form, details or proportions of the parts without departing from the spirit and scope of the invention, herein disclosed and claimed.

What I claim is:—

1. A shoring clamp comprising a yoke adapted to embrace parallel timbers or other parts to be clamped and having substantially parallel sides and an end portion inclined thereto, said yoke having slots extending through its sides adjacent said end portion, and a right-angle wedge extending through said slots engaging said end portion with its inclined side and adapted to engage one of said timbers and extend transversely thereof to draw the yoke into clamping relation with said timbers.

2. A shoring clamp comprising a yoke adapted to embrace parallel timbers having substantially parallel sides, an end portion extending at right angles thereto, and an end portion inclined to said sides, said sides having slots extending therethrough adjacent said latter end, and a right-angle wedge extending through said slots having its inclined side engaging said latter end and also adapted to engage one of said timbers to draw said yoke into clamping position.

3. A clamp comprising a yoke with parallel sides having right angled extensions at one end and connected by an inclined end piece at the other and provided with longitudinal wedge-seating slots extending through said sides adjacent said inclined end wall, and a wedge adapted to be seated in said slots and have its inclined side co-operate with said inclined end of said yoke to draw the yoke into clamping position in relation to the parts embraced thereby.

4. The structure set forth in claim 3, said wedge having a slot extending longitudinal therethrough adjacent one side of said yoke, and a wedge disposed in said latter slot bearing against the end of the same and the side of said yoke.

5. A clamp for clamping members of rectangular cross sections comprising a yoke adapted to embrace said members having aligned slots in its sides, and one end inclined at an acute angle to its other end, and a right angle wedge plate having its wedge angle substantially the same as said acute angle disposed in said slots and having its straight edge bearing flat against one side surface of one of said members and its inclined edge bearing against the inclined end of said yoke throughout the length thereof.

6. A shoring clamp adapted to clamp two parallel timbers together comprising a yoke having parallel side portions and an end portion inclined thereto, and a right-angle wedge member extending through said side portions at right angles to said timbers and disposed with its inclined edge bearing against said end portion.

In testimony whereof I affix my signature.

HOWARD O. McMILLAN.